(No Model.)

H. K. STEVENS.
COW MILKER.

No. 421,985. Patented Feb. 25, 1890.

Witnesses:
Theo. A. Elliott.
B. G. Mering

Inventor
Henry K. Stevens
By Silas J. Douglass

UNITED STATES PATENT OFFICE.

HENRY K. STEVENS, OF BUFFALO, NEW YORK.

COW-MILKER.

SPECIFICATION forming part of Letters Patent No. 421,985, dated February 25, 1890.

Application filed October 12, 1889. Serial No. 326,884. (No model.)

*To all whom it may concern:*

Be it known that I, HENRY K. STEVENS, a citizen of the United States, residing at the city of Buffalo, in the county of Erie and State of New York, have invented a new and useful Improvement in Milking-Machines, of which the following is a specification.

My invention relates to dairy appliances, and is a labor-saving device designed for drawing milk from animals without pressure upon their teats.

The object of my invention is to improve upon the devices now known and to provide a device which will permit the milk to escape quickly from the udder without force upon or irritation to the teats.

Figure 1:
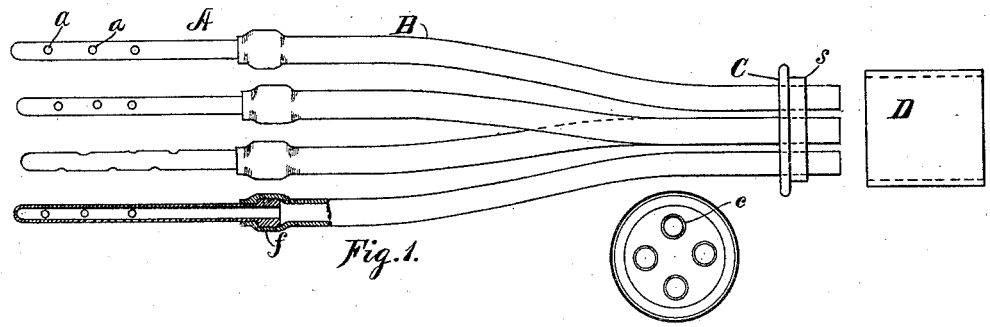
Figure 2:
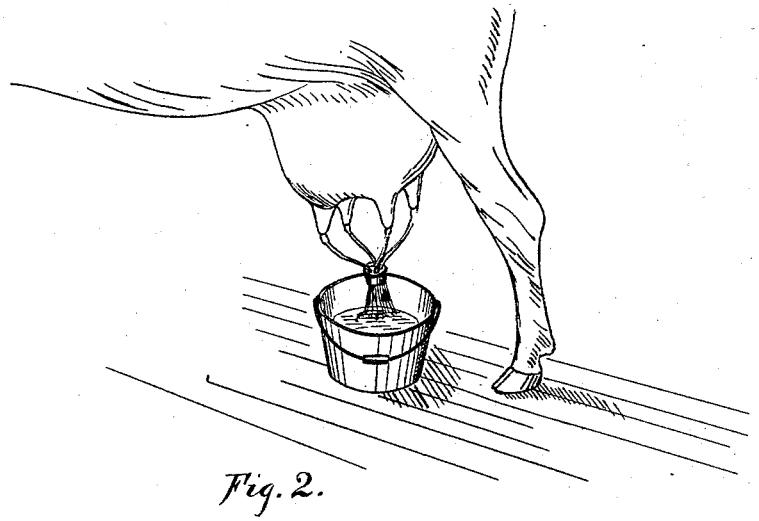

I accomplish the object of my invention by means of the devices illustrated in the accompanying drawings, in which Figure 1 is a perspective view of the device, but with a portion of one of the teat-tubes broken away and with the thimble-ring removed from its head, so as to better illustrate the device. Fig. 2 is a similar view showing the device as it appears when attached to the animal.

In the drawings similar letters refer to corresponding parts.

A represents the spile, B the flexible duct leading from it to the thimble-head C, and D is the thimble-shell.

The teat-tubes are of a non-corrosive substance, preferably of hard rubber, hollow, and provided with a rounded point and enlarged base, as shown, and with perforations *a a* upon opposite sides, as shown. The thimble is also constructed of non-corrosive material, and its head is provided with perforations *c c c c*, designed for the reception of one end of the flexible tubes, as shown. It is also provided with a lip or rim *s*, designed for the reception of the thimble-shell. This separation of the thimble-shell from its head is very desirable, as it greatly facilitates the cleaning of the device.

The teat-tubes are designed to be inserted in the teat in the channel or opening designed for the escape of the milk, and the thimble is designed to direct the flow after the milk leaves the flexible tube. The thimble-shell may be elongated, if desired.

I am aware that it has been proposed to use cow-milkers provided with teat-tubes and flexible ducts or tubes leading therefrom similar in construction to those shown by me; but in such devices the outer ends of these flexible tubes have been drawn over or inserted within other tubes, or so confined as to form an obstructing-ring not easily accessible, upon which the milk tends to collect, sour, and cake, while with my device the outer ends of the tubes B are simply confined within the thimble-shell (discharge-tube) without obstructing the flow of the milk, and from the outside by means of the removable head C; and hence when the ends of these tubes are withdrawn from the perforations in the removable head C all parts are accessible and may be easily cleansed.

What I claim, therefore, and desire to secure by Letters Patent, is—

The herein shown and described milking device, consisting of the combination, with the hard-rubber teat-tubes A, with side perforations *a* and enlarged base *f*, and the flexible ducts or tubes B, of the hard-rubber head C and shell D, the head being provided with a flange *s* for the reception of the shell and with perforations *c* for the reception of the tubes, whereby the tubes are confined within the shell without obstructing the flow of the milk, all as and for the purpose set forth.

HENRY K. STEVENS.

Witnesses:
SILAS J. DOUGLASS,
R. E. WIGHT.